(No Model.) 2 Sheets—Sheet 1.

J. B. & G. T. TUCKERMAN.
CORN HARVESTER.

No. 513,161. Patented Jan. 23, 1894.

WITNESSES.
Rich. A. George.
G. A. Gaymords

INVENTORS
JOHN B. TUCKERMAN,
GEORGE T. TUCKERMAN.
By Kirby & Robinson
ATTORNEYS

THE NATIONAL LITHOGRAPHING COMPANY,
WASHINGTON, D. C.

(No Model.) 2 Sheets—Sheet 2.
J. B. & G. T. TUCKERMAN.
CORN HARVESTER.
No. 513,161. Patented Jan. 23, 1894.
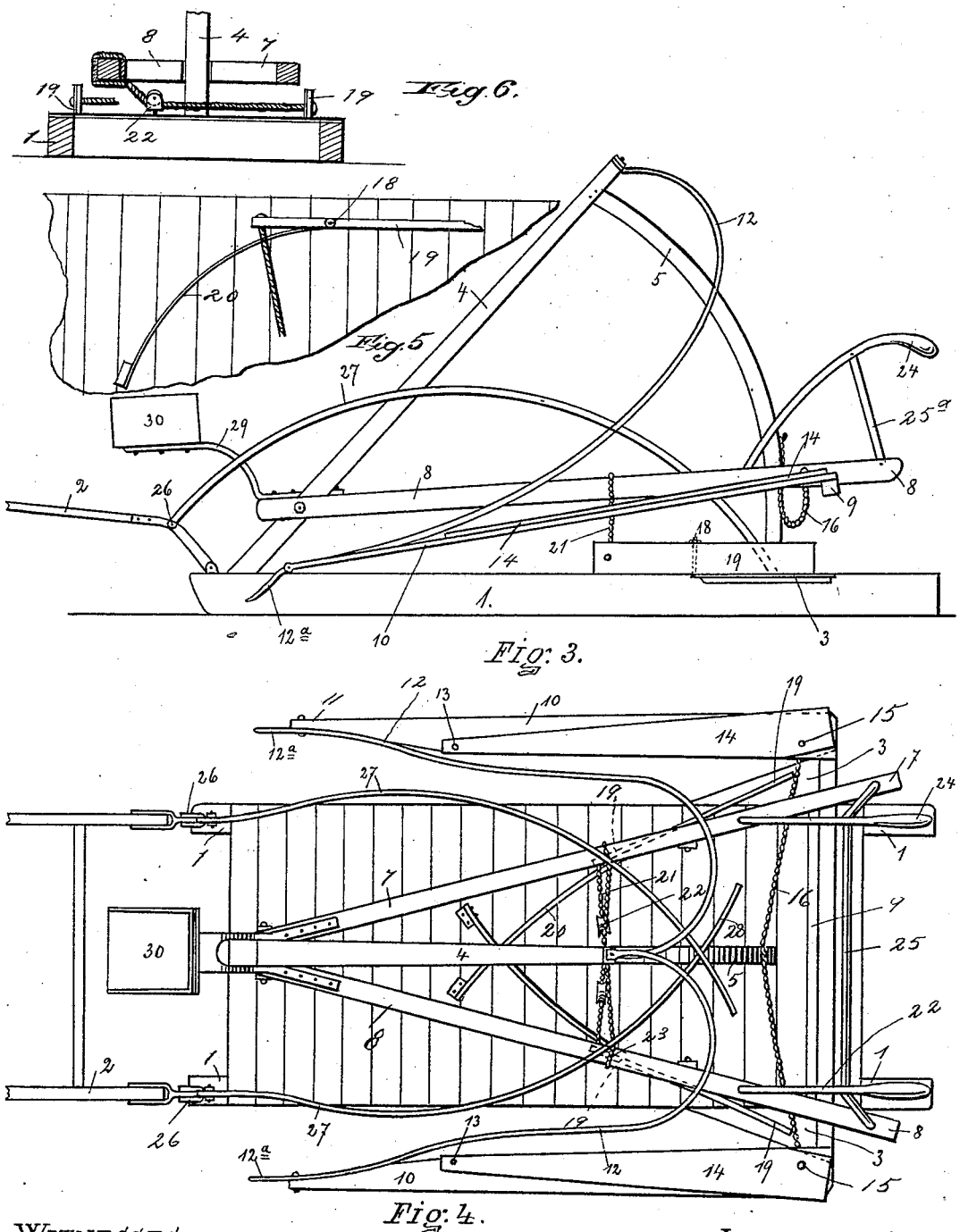
WITNESSES.
Rich. A. George.
G. A. Gaynicards
INVENTORS.
JOHN B. TUCKERMAN &
GEORGE T. TUCKERMAN.
By Risley & Robinson
ATTORNEYS.

UNITED STATES PATENT OFFICE.

JOHN B. TUCKERMAN AND GEORGE T. TUCKERMAN, OF CASSVILLE, NEW YORK.

CORN-HARVESTER.

SPECIFICATION forming part of Letters Patent No. 513,161, dated January 23, 1894.

Application filed March 15, 1893. Serial No. 466,078. (No model.)

*To all whom it may concern:*

Be it known that we, JOHN B. TUCKERMAN and GEORGE T. TUCKERMAN, both of Cassville, in the county of Oneida and State of New York, have invented certain new and useful Improvements in Corn-Harvesters; and we do hereby declare that the following is a full, clear, and exact description of the invention, which will enable others skilled in the art to which it appertains to make and use the same, reference being had to the accompanying drawings, and to the figures of reference marked thereon, which form part of this specification.

Our invention relates to improvements in machines for harvesting corn and similar products.

Figure 1:
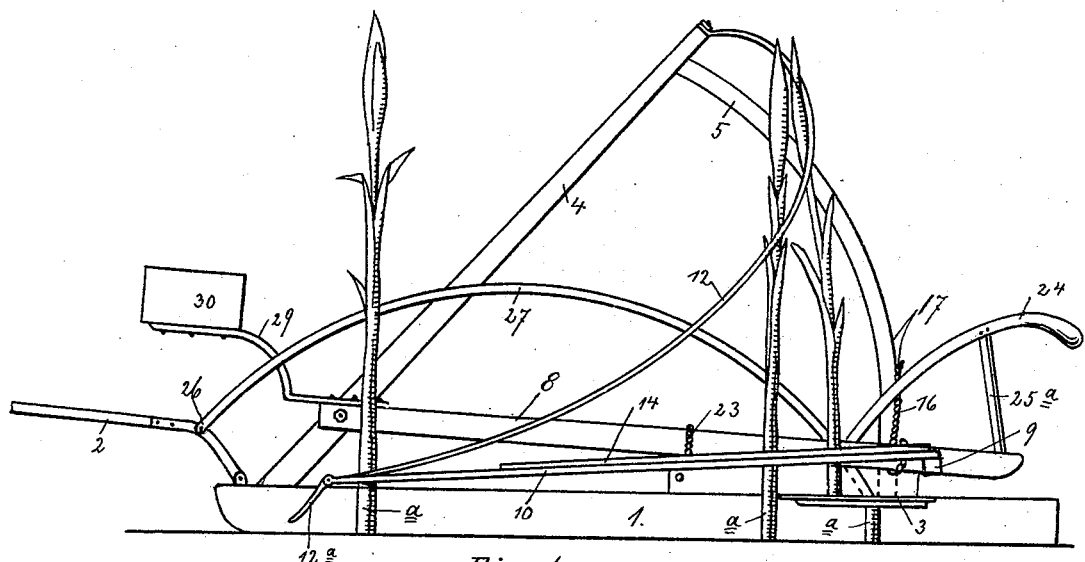
Figure 2:
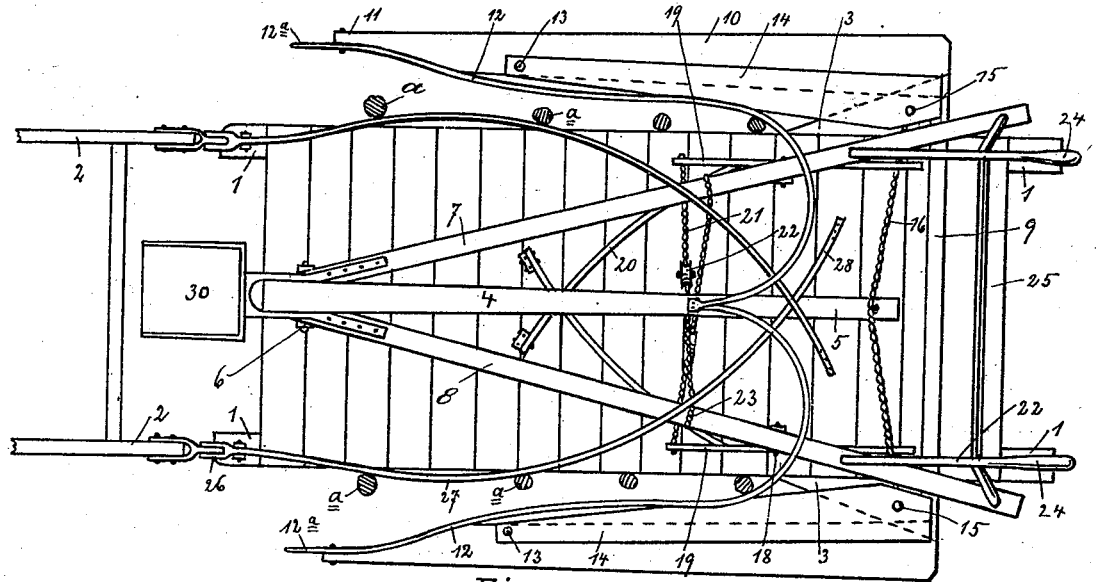

In the drawings which accompany and form a part of this specification and in which similar figures of reference refer to corresponding parts in the several views, Figure 1 shows a side elevation of our improved machine. Fig. 2 shows a plan view of the same. Fig. 3 shows a side elevation with the parts in a different position from those shown in Fig. 1. Fig. 4 shows a plan view of the parts as shown in Fig. 3. Figs. 5 and 6 show details of construction.

Referring more particularly to the reference numerals marked on the drawings in a more specific description of the device, 1—1 indicates a pair of runners on which the working parts of the machine are mounted and which runners have attached to the forward end a pair of shafts 2. The runners have a platform secured thereon and the runners and platform constitute a sled. The width of the sled is a little less than the distance between the drills of corn which the device is intended to cut, as will appear from Fig. 2. Projecting from either side of the sled on the rear portion thereof and rigidly secured are the cutting knives 3—3 inclining outward as they extend rearward with reference to the sled. Rising on an incline from the forward portion of the sled and rigidly secured is a standard 4. The upper portion of the standard is supported by a brace 5 which extends downward and is attached to the rear portion of the sled. Adjacent to the base of the standard 5 is pivoted at 6 a triangular frame formed of bars 7, 8 and 9 rigidly secured together. The cross bars 9 extend outwardly beyond the sides of the sled and beyond the rear corners of the knives and has rigidly secured to its outer ends the forwardly extending finger-bars 10. To the forward end of the finger-bar is pivotally attached at 11 the stalk guiding rod 12 which gradually rises from the forward end of the finger-bar upward to a position above and a little forward of the knife and thence curving about is connected with the upper end of the standard 4. The forward end of the rod 12 may be extended beyond the pivotal point 11 and downward in a prong or point 12$^a$ if desired, which will follow close to the ground and raise any fallen or inclined stalks in position to be cut. On the finger-bar 10 is pivoted at 13 a swinging gripping board 14. There is attached to the gripping board at 15 a rope or cord 16 which passes under the bar 7 and 8, depending on the side, and thence upward and is secured at 17 on the brace 5.

Pivoted on the platform at 18 so as to have a horizontal swinging movement is a wiper 19, the swinging end of which is adapted to swing up to or by the edge of the knife to wipe the butts of the stalks off from the knife. The wiper is returned to its normal position by a spring 20 secured to the platform and is operated by a cord 21 which passes through a pulley 22 secured on the platform and is thence attached at 23 to the bar of the triangular movable frame on the opposite side of the machine. There is provided on the triangular frame a pair of handles 24, similar to cultivator handles.

25 is a cross or stay bar between the handles, and also extends down in parts marked 25$^a$ forming braces for the handles. Coupled to the thill at 26 is a rod 27, which bends over and inward as shown, and is attached at 28 to the platform of the sled. This rod forms a guide on the inside of the corn and is preferably curved substantially as shown in the plan and side views. The forward coupling at 26 may be made directly to the forward end of the sled if found desirable. On the forward end of the "A" shaped movable frame is provided on an arm 29 a box 30 which may be loaded to form a counter-poise for the frame or furnish a seat for a driver.

The operation of the device is substantially as follows:—As before stated the machine is intended for cutting corn in drills, and preferably in its green state for ensilage purposes, and to drop the corn in unbound bundles or gavels suitable in size for a man to handle. To this end the sled portion of the device is made of a width to be conveniently moved between the adjacent rows or drills of corn, and is drawn by a single horse attached to the thills 2. The operator follows the device and operates it by means of the handles 24. In the operation of cutting the parts are substantially in the position shown in Fig. 1 or even with the frame formed of the bars 7, 8 and 9 in a trifle lower position than shown. As the device is drawn forward the corn passes in between the guiding rods 12 and 27 and toward the knife. Any fallen or weak stalks are picked up by the finger 12$^a$ on the outside and by the runners, thills and rod 27 on the inside and the corn is brought in a substantially upright position to the knife. As it reaches the knife it is severed from the stubble, the butt of the corn being held to the knife by the pressure of the gripping bar 14 which is held in position by the weight of the triangular frame or the pressure exerted by the operator on the handles 24 and the connecting parts. As the corn is severed the upper portion of the stalk is held by the curved portion of the rod 12 and the severed butt rests upon the knife 3 and is gripped onto the frame by the gripping board 14. The severed stalk or stalks are held from falling forward by the forward movement of the device and by engagement with the next stalk in the drill. The several stalks are held in a bundle as cut until the desired quantity to form a bundle or gavel is obtained. The butts of the stalks resting upon the knife, and the operator is able to regulate the amount which the knife will hold by raising the triangular frame or relieve it from downward pressure and allowing the gripping boards 14 to work outward to some extent. When the quantity desired for a gavel is obtained the operator raises the triangular frame by means of the handles 24. This operation frees the gripping boards 14 and at the same time operates the wipers 19 which throw the butts of the corn off from the knife and platform and in the clear space which is given when the triangular frame is raised and the butts being thrown off from any support the corn drops through onto the ground and is drawn outward from the device by the continued forward movement. As soon as the gavel has been discharged the operator immediately brings the frame down onto the platform which brings in the gripping boards and returns the wipers to their normal position. At the time that the bundle is discharged the stalks that have come to the knife at the time of the dumping will be cut by the forward edge of the knife and will pass onto the platform, or if they should be on the outside next to the gripping board they will be sheared off as the gripping board is closed up when the movable frame is forced downward.

While the description has been made with reference to one side only, the device shown is intended to simultaneously cut two rows and make bundles simultaneously from each row.

It is evident that the machine could be modified in several particulars and provided with mechanism on only one side for cutting a single row if desired, but we prefer the construction shown.

What we claim as new, and desire to secure by Letters Patent, is—

1. In a moving harvesting machine, a platform, a knife fixed on the edge of the platform in the same plane therewith, and having its cutting edge inclining outwardly from the front toward the rear, a finger located in a plane above the knife and platform and projecting forwardly from a point substantially over the outer corner of the knife, a stalk guide and holder formed to a position substantially above the knife, a wiper mounted on the platform and adapted to move to clear the platform and knife from the cut stalks supported thereon, and means for operating the wiper, substantially as set forth.

2. In a corn harvesting machine, a main frame, a triangularly shaped fixed knife projecting from the side of the frame, a movable frame above the main frame, a finger secured at its rear end to the movable frame and extending forward from a point substantially over the projecting corner of the knife, and a wiper on the main frame, and operated by the movement of the upper movable frame, combined substantially as described.

3. In a corn harvester, the combination of a main frame, a triangularly shaped knife projecting from the side of the frame, a movable upper frame, a finger attached to the movable frame and projecting forward from a point substantially over the projecting corner of the knife, a bar on the finger and opposed to the cutting edge of the knife and operated by the movement of the upper frame, a post on the frame, a stalk holder attached at one end to the forward end of the finger and formed on a gradually rising incline from the end of the finger to a point above the opening between the finger and frame and attached to the post, substantially as set forth.

4. In a corn harvester, the combination of a main frame, a triangularly shaped knife projecting from the side of the frame and having its cutting edge diverging toward the rear from the frame, a finger extending from a point substantially coincident with the projecting corner of the knife, a movable holding board on the finger opposed to the cutting edge of the knife, a stalk holder above the opening between the finger and frame, a wiper on the frame operating over the knife and connections whereby the holding board and wiper are operated, substantially as set forth.

5. The combination in a corn harvester of a main frame, a triangular knife secured in and projecting from the rear portion of the frame, a movable frame above the main frame, a finger projecting forward from a point substantially over the projecting corner of the knife, having a clear opening from the front to the edge of the knife, the finger being rigidly attached to the upper frame, a movable holding board on the finger and opposed to the cutting edge of the knife, a connection between the holding board and main frame, a wiper operating over the knife and operated from the movable frame, and a stalk guide and holder over the opening between the finger and main frame, substantially as set forth.

6. In a corn harvester, a movable platform, a fixed knife secured on the edge of the platform in the same plane therewith and having its cutting edge inclining outwardly from the front toward the rear end of the knife, a finger located in a plane above the knife and platform and projecting forwardly from a point substantially over the outer corner of the knife and opposed to the cutting edge of the knife and movable to a still higher plane to allow the cut stalks to escape from the rear end of the platform and knife, a wiper operating to clear the knife and platform from the accumulation of cut stalks thereon, and means for operating the finger and wiper, substantially as set forth.

In witness whereof we have affixed our signatures in presence of two witnesses.

JOHN B. TUCKERMAN.
GEORGE T. TUCKERMAN.

Witnesses:
CARLTON TOWNSEND,
HEZEKIAH MANCHESTER.